(12) United States Patent
Chan et al.

(10) Patent No.: US 7,845,567 B2
(45) Date of Patent: Dec. 7, 2010

(54) CONTACTLESS CARD READER AND INFORMATION PROCESSING SYSTEM

(75) Inventors: Ming Sum Chan, Hong Kong (HK); Chun To Lee, Lai Chi Kok (HK)

(73) Assignee: International Business Machines Corporation, Armonk, NY (US)

( * ) Notice: Subject to any disclaimer, the term of this patent is extended or adjusted under 35 U.S.C. 154(b) by 612 days.

(21) Appl. No.: 11/245,388

(22) Filed: Oct. 6, 2005

(65) Prior Publication Data

US 2006/0113385 A1 Jun. 1, 2006

(30) Foreign Application Priority Data

Nov. 30, 2004 (CN) .................. 2004 1 0965538

(51) Int. Cl.
*G06K 19/06* (2006.01)
(52) U.S. Cl. .................................... 235/492
(58) Field of Classification Search ............. 235/440, 235/441, 492, 380, 451, 472.02
See application file for complete search history.

(56) References Cited

U.S. PATENT DOCUMENTS

| | | | | |
|---|---|---|---|---|
| 6,070,796 A | 6/2000 | Sirbu | .......................... | 235/382 |
| 6,142,369 A * | 11/2000 | Jonstromer | .................. | 235/380 |
| 6,256,690 B1 | 7/2001 | Carper | ......................... | 710/102 |
| 6,360,953 B1 * | 3/2002 | Lin et al. | ..................... | 235/492 |
| 6,513,719 B1 * | 2/2003 | Imura | ........................ | 235/492 |
| 6,776,332 B2 | 8/2004 | Allen et al. | ................ | 235/380 |
| 6,776,339 B2 | 8/2004 | Piikivi | ........................ | 235/451 |
| 7,044,389 B2 * | 5/2006 | Nishizawa et al. | .......... | 235/492 |
| 7,246,750 B2 * | 7/2007 | Cho | ........................... | 235/492 |
| 2001/0054148 A1 | 12/2001 | Hoornaert et al. | ........... | 713/172 |
| 2002/4040438 | 4/2002 | Fisher, Jr. | .................... | 713/200 |
| 2003/0236748 A1 | 12/2003 | Gressel et al. | ................ | 705/41 |
| 2004/0012620 A1 | 1/2004 | Buhler et al. | ................ | 345/716 |
| 2004/0025035 A1 | 2/2004 | Jean-Claude et al. | ........ | 713/189 |
| 2004/0083380 A1 | 4/2004 | Janke | ......................... | 713/194 |
| 2004/0098587 A1 | 5/2004 | Sueyoshi et al. | ............ | 713/169 |
| 2004/0127256 A1 * | 7/2004 | Goldthwaite et al. | ........ | 455/558 |
| 2004/0133787 A1 | 7/2004 | Doughty et al. | ............. | 713/186 |
| 2005/0086497 A1 * | 4/2005 | Nakayama | .................. | 713/185 |

* cited by examiner

*Primary Examiner*—Seung H Lee
(74) *Attorney, Agent, or Firm*—Cantor Colburn LLP; Ronald Kaschak

(57) ABSTRACT

The present invention provides a contactless card reader and an information processing system utilizes the card reader. The contactless card reader comprises a contactless card interface for communicating with a contactless card by means of radio frequency, a contact card interface coupled to said contactless card interface for communicating with a contact card, and a contact card which is a smart card with processing capability and which interacts with the contactless card via the contact card interface and contactless card interface.

12 Claims, 1 Drawing Sheet

CONTACTLESS CARD READER AND INFORMATION PROCESSING SYSTEM

FIELD OF THE INVENTION

The present invention relates to information processing technology, more particularly, to the technology of enhancing the security of a contactless card.

BACKGROUND OF THE INVENTION

A smart card is a kind of Interconnect Card (IC) card that has memory and/or microprocessor etc. embedded in a plastic card for implementing features such as identity authentication, data signature, access control etc. Because it is easy to carry and use, it has been widely used in daily life, for example, as an identity badge in a company, a subscriber identity module (SIM) card in a GSM communication system, an e-ID card, an EMV (Eurocard-Mastercard-Visa) card or a so-called e-purse etc.

According to its processing power, a smart card can be classified into a memory card type if it includes only a memory feature or a microprocessor card type if it includes both a memory feature and a microprocessor feature. A memory card can store data but cannot manipulate the data, and thus can be considered similar to a disk. Generally a memory card can include a security authentication feature and is then capable of authenticating access to the data stored therein to protect against unauthorized access. A microprocessor card not only can store data like a memory card, but also can manipulate the data stored therein. A microprocessor card can have an operating system (referred to as namely card operating system (COS)) so computer and various applications can be installed and executed therein to implement various features. For example, installed and executable features can be data encryption/decryption, the implementation of PKI, modifying and maintaining data based on business rules etc.

In addition, according to its communication mode, a smart card can be classified into a contact card type or a contactless card type. A contact card must be inserted into a card reader for operation. When a contact card is being used, the interface of a card reader makes contact with the contacts on the card, and supplies power to the contact card via these contacts and communicates with the contact card. A contactless card communicates with other devices (card reader) via a radio frequency interface. When a contactless card enters the effective range of a card reader's antenna, it will be activated and make wireless communications with the card reader via a built-in antenna.

A contactless card, due to it interacting with other devices via wireless communications, has many advantages. For example, there is no need to take out the contactless card from a wallet or a bag and insert it into a card reader. It is convenient for a user to carry and use, which enhances the operation speed, reduces the risk of being lost and ensures it will not be worn out by the card reader. It also extends the lifetime of the contactless card. However, a contactless card also has many technical limitations. For example, since each time period a reader is activated to establish a session with a contactless card is very short, it is difficult for a contactless card to achieve a powerful processing capability and accomplish sophisticated processing tasks. The cost will therefore be high. Therefore, what are widely used at present are the low cost memory card type contactless cards (namely, memory contactless cards).

One main security threat of a memory card type contactless card comes from the host computer and the card reader. Since a memory card does not have its own operating system and processing capabilities of applications, its data manipulation and encryption depends on the card reader and the host computer. However, the firmware and software in a card reader and a host computer are susceptible to be cracked and tampered by reverse engineering, particularly, the danger is greater that the host computer could be intruded into, cracked and tampered.

At the same time, a contact type microprocessor card is generally considered to have high security, since data, applications and the operating system are completely encapsulated in the card, and like a black box, it is difficult to be cracked and intruded.

Therefore, it is desirable to be able to make up for the deficiency in security of an easy to use, low cost memory type contactless card by utilizing the advantages of a contact type microprocessor card.

SUMMARY OF THE INVENTION

The present invention is proposed in view of the above problems in the prior art, and its purpose is to manipulate the data in a contactless card with the secure program in a contact type microprocessor card so that secure and convenient data processing can be implemented.

According to one aspect of the invention, there is provided a contactless card reader comprising a contactless card interface for communicating with a contactless card by means of radio frequency, a contact card interface coupled to the contactless card interface for communicating with a contact card, the contact card being a smart card with processing capability and adapted to interact with the contactless card via the contact card interface and contactless card interface.

According to another aspect of the invention, there is provided a data processing system comprising at least one contactless card and a contactless card reader comprising a contactless card interface for communicating with a contactless card by means of radio frequency, and a contact card interface coupled to the contactless card interface for communicating with a contact card, the contact card being a smart card with processing capability and adapted to interact with the contactless card via the contact card interface and contactless card interface.

According to yet another aspect of the invention, there is provided a method of operating a contactless card reader comprising the steps of providing a contactless card reader including a contactless card interface for communicating with a contactless card by means of radio frequency, a contact card interface coupled to the contactless card interface for communicating with a contact card, the contact card being a smart card with processing capability and adapted to interact with the contactless card via the contact card interface and contactless card interface, providing an authentication program, and executing the authentication program to perform authentication with the contactless card via the contact card interface and contactless card interface.

BRIEF DESCRIPTION OF THE FIGURES

It is believed that the features, advantages and purposes of the present invention will be better understood from the following description of the detailed implementation of the present invention taken in conjunction with the accompanying drawings, in which.

DETAILED DESCRIPTION OF THE INVENTION

Next, various preferred embodiments of the invention will be described in detail in conjunction with accompany drawings.

Figure 1:
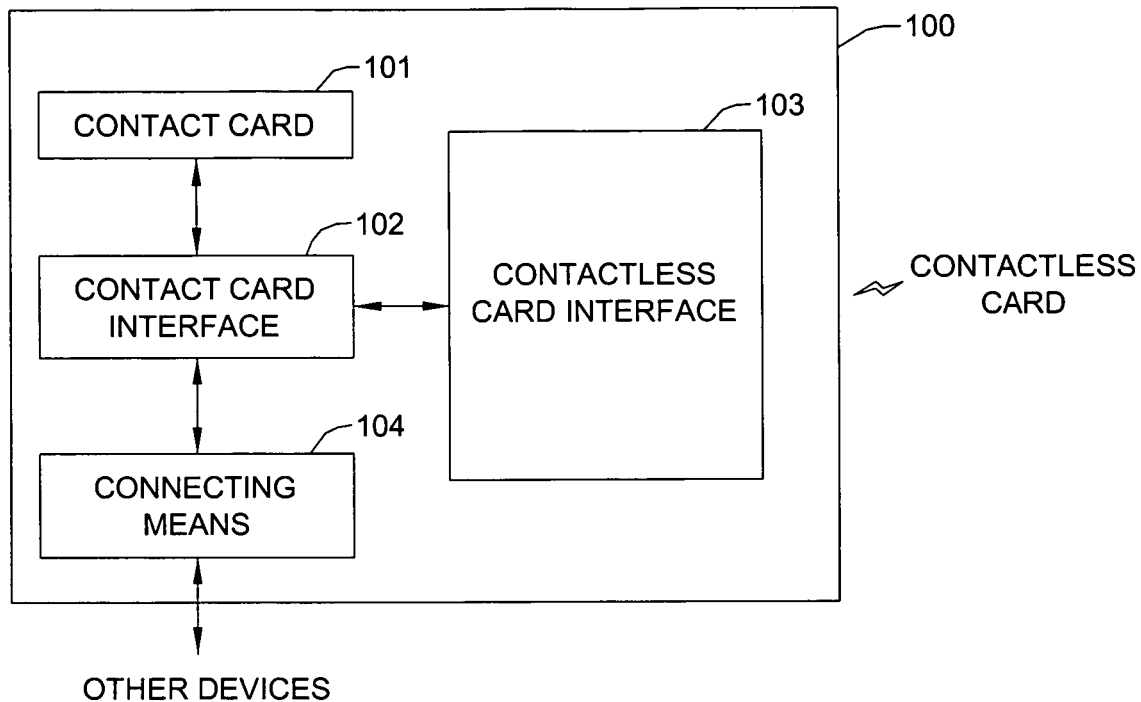
FIG. 1 is a block diagram that shows the structure of a contactless card reader according to one embodiment of the invention.

FIG. 1 is a block diagram that shows the structure of a contactless card reader according to one embodiment of the invention. As shown in FIG. 1, a contactless card reader 100 of the present embodiment comprises a contactless card interface 103 for communicating with a contactless card by means of radio frequency, a contact card interface 102 for receiving and interfacing with a contact card and communicating with the contact card, and a contact card 101 which is received into the card reader 100 and works cooperatively with the card reader through said contact card interface. In addition, the card reader 100 also has a connecting means 104 for connecting with other devices (not shown).

Next, various components of contactless card reader 100 of the present embodiment will be described in detail. The contactless card interface 103, which is substantially the same as the contactless card interface (or referred to as a wireless module or a contactless module) in a conventional contactless card reader, comprises an antenna and a modem for communicating with a contactless card by means of radio frequency, and at the same time, supplies power to the contactless card, for example, as defined in accordance with the ISO14443 specification of the International Standard Organization.

Contact card interface 102, which is substantially the same as the contact card interface in a conventional contact card reader, comprises multiple contacts of power, reset, clock and I/O etc., that make contact with the corresponding contact area on contact card 101 respectively. Contact card interface 102 supplies power and clock signals to contact card 101 via the contacts and performs data exchange with the contact card, for example, as defined in accordance with the ISO7816 specification of the International Standard Organization.

Contact card 101 is a contact type microprocessor smart card with processing capability, which has its own operating system (COS) and stores therein the applications for manipulating the data in a contactless card (to be described later). Contact card 101 may be a smart card that complies with said ISO7816 specification and can be inserted into the contact card slot (not shown) of card reader 100 for interfacing with the contact card interface (with the contacts making corresponding contact respectively). Preferably, contact card 101 is a Javacard or a Multos card.

Interface means 104 can be any interface means, such as a USB interface, a serial or parallel port, a network interface etc., that is capable of communicating with other devices, for example, a computer.

When contactless card reader 100 of the present embodiment is operating, if a contactless card enters the effective radio frequency (RF) range of contactless card interface 103, the contactless card will be activated by the RF signals emitted from the card reader. Then, the application executed in contact card 101 in card reader 100 will authenticate contactless card 100 and/or manipulate the data stored therein. In particular, for example, an authentication program that employs a symmetrical algorithm or asymmetrical algorithm can be stored in contact smart card 101. When the contactless card enters the effective range, contact smart card 101 will execute the program and authenticate the contactless card via contact card interface 102 and contactless card interface 103.

Thus, by utilizing contact smart card 101 with high security to authenticate a contactless card, the contactless card reader 100 of the present embodiment can avoid the security problems caused by the firmware and/or software in a card reader or a host computer. In addition, since a contact smart card can be replaced conveniently (simply by pulling out from/inserting into the slot), updating and maintaining card reader 100 will become convenient and quick. Also the manufacturing of card readers can be standardized and different demands can be accommodated by replacing different contact smart cards, thereby reducing the manufacturing cost of the card reader.

Contact smart card 101 not only can be used to authenticate a contactless card, but also can be used to manipulate the data in a contactless card. A film ticketing system will be used as an example to describe the detailed application of one embodiment of the invention.

Figure 2:
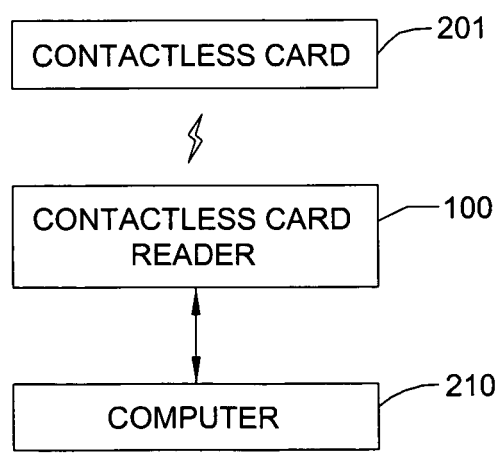
FIG. 2 is a structure diagram that shows an information processing system according to another embodiment of the invention.

FIG. 2 is a structure diagram that shows an information processing system of one embodiment of the invention. As shown in FIG. 2, the information system comprises a contactless card reader 100, a computer 210 and one or more contactless cards 201. In the present application example, contactless card 201 held by a user is a memory type contactless card, in which is stored the encrypted balance of the user's ticketing account and other information such as the user's ID. Contact smart card 101 located in card reader 100, in addition to having a authentication program, also has the keys that correspond to the encryption mode of the data in the contactless card and an encryption/decryption program, and a data manipulation program (which is, in the present example, a program to modify the balance of an account) in accordance with the business rules. Data such as the time, ticket price etc. of each film, and an application for purchasing tickets is stored in computer 210. Computer 210 interfaces with card reader 100 via connecting means 104 (for example, a USB interface) in card reader 100.

When purchasing a ticket, a user first operates computer 210 to select a film the user wants to watch with the ticketing program and then uses the card to make a purchase. When the user's contactless card 201 enters the effective range of card reader 100, first the contact smart card 101 in the card reader will execute an authentication program to perform mutual authentication. After successful authentication, contactless card 201 will send the encrypted data stored therein to contact smart card 101 in card reader 100. Next, the data will be decrypted in the contact smart card 101 and the balance of the user's account will be modified according to the ticket amount from computer 210. Then, the modified balance of the account will be encrypted and rewritten into contactless card 201 via contactless card interface 103.

From the above description it can be seen that, by employing the present implementation, the manipulation of the data stored in a contactless card will be entirely performed by a contact smart card 201 with high security, and host computer 210 does not directly access and manipulate the data in the contactless card, the security of the data processing system can be greatly improved. Further, what is stored in a contactless card is encrypted data. The keys, the encrypt/decrypt algorithm program and the decrypted data in clear text only reside in the contact smart card, therefore, the danger of being detected and stolen is reduced. In addition, since a contact smart card can be replaced conveniently (simply by pulling out from/inserting into the slot), updating and maintaining the card reader 100 will become convenient and quick. The manufacturing of card readers can be standardized and different demands can be accommodated by replacing different contact smart cards, thereby reducing the manufacturing cost of the card reader.

Also, it should be pointed out that, according to different practical needs, various variations can be made to the data processing system in FIG. 2. For example, when applications in contact smart card 101 can operate the data in contactless card 201 independently, the computer 210 may not be necessary.

In addition, according to another embodiment of the invention, the authentication with a contactless card can also be performed by the firmware in card reader 100, so that contact smart card 101 will only be used to operate the data in contactless card 201. Compared with a program in the host computer, the security of the firmware in card reader 100 is much higher, so in such an embodiment, the burden on contact smart card 101 can be reduced as well as the security can be ensured to some extent. In the present embodiment, card reader 100 also includes a processor and a memory for executing and storing a firmware program respectively. The memory for storing the firmware program is preferably a read-only memory, such as an EPROM etc.

In addition, according to yet another embodiment of the invention, a displaying means can also be provided on card reader 100 for displaying the content in the contactless card or contact card and the prompt information of an application to a user. Further, card reader 100 may also comprise an inputting means to allow a user to input information, such as to input a PIN code or the option of confirming or canceling an operation.

According to still yet another embodiment of the invention, a plurality of key/data pairs for a plurality of applications (for example, a ticketing system application, an e-purse application and an e-ID application etc.) are stored in contactless card 201 respectively. Multiple partitions can be divided in contact smart card 101 for the plurality of applications, with each partition storing therein the keys, application program corresponding to the application, and the information related to the application.

When operating, first an authentication program is executed by contact smart card in card reader 100 (or by utilizing the firmware in the card reader itself) to perform a mutual authentication with the contactless card. After successful authentication, contact smart card 101 requests data from contactless card 201 using a key corresponding to a particular application.

Next, contactless card 201 sends the data corresponding to the key to contact smart card 101. Contact smart card 101 restores the data sent from the contactless card 201 into clear text using the corresponding key and decryption/encryption algorithm, and in response to the instructions of the host computer, processes the data (for example, adding to or deducting from a balance) with the application program in the application's partition. Finally, contact smart card 101 re-encrypts the resulting data and returns it to contactless card 201 to store therein.

The technology of partition protection of a contact smart card is considered to be a technology that can securely differentiate different applications. In the present embodiment, by extending the partition in a contact smart card to a contactless card, the data for multiple applications can be stored in a contactless card simultaneously and these data can be processed in isolation. Thus, for each application, since the manipulation of the data stored in a contactless card can be entirely performed in isolation from each other by a contact smart card with high security, host computer 210 does not directly access and manipulate the data in contactless card 201 and the host computer does not know the security policy (encryption mode etc.) of each application. Therefore the security of the data processing system can be greatly improved. Further, what is stored in a contactless card is encrypted data, and the keys, the encryption/decryption algorithm programs and the decrypted data in clear text will only reside in the application partitions in isolation from each other within the contact smart card. Therefore, the danger of detection and theft is reduced. In addition, since a contact smart card can be replaced conveniently (simply by a pull out from/insert into the slot), updating and maintaining card reader 100 will become convenient and quick, also the manufacturing of a card reader can be standardized and different demands can be accommodated by replacing different contact smart cards, thereby reducing the manufacture cost of the card reader.

Although the contactless card reader and the information processing system of the invention have been described in detail with some illustrative embodiments in the above, these embodiments are not exhaustive, and various changes and modifications may be implemented by one skilled in the art within the spirit and scope of the invention. Accordingly, the invention is not limited to these embodiments, and the scope of the invention is only defined by the appended claims.

What is claimed is:

1. A contactless card reader, comprising:
a contactless card interface for communicating with a contactless card by means of radio frequency; and
a contact card interface coupled to said contactless card interface for communicating with a contact card, said contact card being a smart card with processing capability and adapted to interact with said contactless card via said contact card interface and contactless card interface;
wherein said contact card includes an authentication program executed at the contact card.

2. The contactless card reader as in claim 1, wherein data is stored in said contactless card and said contact card includes an application program for processing the data stored in said contactless card.

3. The contactless card reader as in claim 2, wherein said data stored in said contactless card is encrypted data, and said contact card includes a corresponding encryption/decryption algorithm program.

4. The contactless card reader as in claim 2, further comprising a connecting means for connecting with external devices, and commands for external devices to process said data in said contactless card.

5. The contactless card reader as in claim 1, further comprising a memory and a processor for storing and processing firmware, respectively.

6. The contactless card reader as in claim 1, further comprising:
a displaying means for displaying information to a user, and
an inputting means for allowing a user to input information.

7. The contactless card reader as in claim 1, wherein said contactless card includes key and data pairs for a plurality of applications stored therein; and
said contact card is divided into a plurality of partitions, each partition corresponding to one of said plurality of applications.

8. A data processing system, comprising:
at least one contactless card;
a contactless card reader, comprising:

a contactless card interface for communicating with a contactless card by means of radio frequency; and a contact card interface coupled to said contactless card interface for communicating with a contact card, said contact card being a smart card with processing capability and adapted to interact with said contactless card via said contact card interface and contactless card interface;

wherein said contact card includes an authentication program executed at the contact card.

9. The data processing system of claim 8 further including a computer coupled to said contactless card reader.

10. A method of operating a contactless card reader comprising the steps of:

providing a contactless card reader which includes a contactless card interface for communicating with a contactless card by means of radio frequency, and a contact card interface coupled to said contactless card interface for communicating with contact card, said contact card being a smart card with processing capability and adapted to interact with said contactless card via said contact card interface and contactless card interface;

providing an authentication program on the contact card; and executing said authentication program at the contact card to perform authentication with said contactless card via said contact card interface and contactless card interface.

11. The method of claim 10, further including the steps of;

providing a contactless card having data stored therein; and executing an application program in said contact card to process said data in said contactless card.

12. The method of claim 11, further including the steps of:

providing a connecting means for connecting said contactless card reader with external devices, said external devices causing the execution of another application program in said contact card to process said data in said contactless card, using commands stored in said contact card.

* * * * *